United States Patent Office 3,350,477
Patented Oct. 31, 1967

3,350,477
COPOLYMERS OF VINYL DIPHENYL-PHOSPHINE OXIDE
Robert S. Cooper, Park Forest, Ill., assignor to Stauffer Chemical Company, New York, N.Y., a corporation of Delaware
No Drawing. Filed July 7, 1960, Ser. No. 41,230
3 Claims. (Cl. 260—870)

This invention relates to polymers and copolymers of vinyl diphenylphosphine oxide with ethylenically unsaturated organic esters, polyesters, and partially polymerized resin products. The new polymers and copolymers are hard, clear solid resin products having excellent flame self-extinguishing characteristics. They are useful in the form of solid resin objects, and as flame-resistant coatings or films on a variety of substrate materials.

The vinyl diphenylphosphine oxide employed herein may be prepared in accordance with the process described in U.S. Patent 3,035,096, and briefly described as follows: Beta-chloroethyl diphenylphosphine oxide is heated, under reduced pressure, at a temperature of 175°–200° C. for a period of time sufficient to cause dehydrochlorination and the formation of a crystalline vinyl diphenylphosphine oxide product.

The vinyl diphenylphosphine oxide may be homo polymerized by prolonged heating in the presence of an organic peroxide polymerization catalyst.

suitable organic peroxide catalyst such as benzoyl peroxide, acetyl peroxide, tertiary butyl peroxide, etc. in suitable proportions, and heating the mixture in a suitable container, at a polymerizing temperature for a period of time sufficient to form useful highly viscous to solid copolymer products.

A typical procedure is illustrated in the following example.

*Example 2*

Twenty grams of vinyl diphenylphosphine oxide and 80 grams of monomeric styrene and 0.3 gram of ditertiary butyl peroxide were thoroughly mixed and 20 gram portions placed in glass tubes and then heated for 8 hours at 110° C. and 20 hours at 150° C. forming a substantially clear straw colored, hard, tough solid resin product having excellent flame self-extinguishing characteristics. Flame tests showed a burning time of one second.

The flame test for determining the burning time was carried out by heating a piece of the copolymer resin, about ¼″ in diameter, in the tip of a one inch Bunsen blue flame for 15 seconds, then withdrawing the flame and measuring the time for the resin to stop burning, in a relatively draft free area.

A number of typical copolymerizations of vinyl diphenyl-phosphine oxide with various monomers are shown in the following table together with proportions, polymerizing conditions and characteristics of the resulting copolymer products.

| Vinyl Diphenylphosphine Oxide, Percent by wt. | Monomer | Percent by wt. | Percent Ditertiary Butyl Peroxide | Curing Cycle | Physical Character of Resin | Burning Time (seconds) |
|---|---|---|---|---|---|---|
| 10 | Styrene | 90 | 0.08 | 8 hrs. at 110° C | Clear, colorless, hard tough solid. | 5 |
| 20 | ----do---- | 80 | 0.30 | 8 hrs. at 110° C | Straw colored, hard tough solid. | 1 |
| 30 | ----do---- | 70 | 0.70 | 8 hrs. at 110° C | Opaque, straw color hard, brittle solid. | Nil |
| 15 | Methyl Methacrylate | 85 | *0.18 | 16 hrs. at 70° C., 24 hrs. at 85° C. | Clear, hard tough solid | 15 |
| 25 | Unsaturated Polyester (Laminac #4116) | 75 | 1.30 | 16 hrs. at 130°–132° C | Clear, hard tough lt. green solid. | 4 |
| 30 | ----do---- | 70 | 1.30 | 16 hrs. at 130°–132° C | ----do---- | 1 |
| 35 | ----do---- | 65 | 1.40 | 16 hrs. at 130°–132° C | ----do---- | 1 |
| 90 | Diallyl β-cyanoethanephosphonate | 10 | 3.0 | 16 hrs. at 125° C | Brittle, clear, straw colored solid. | Nil. |
| 70 | ----do---- | 30 | 3.0 | 16 hrs. at 125° C | Brittle, clear, yellow | Nil. |
| 30 | ----do---- | 70 | 3.0 | 16 hrs. at 125° C | Brittle, clear, amber | Nil. |
| 10 | ----do---- | 90 | 3.0 | 16 hrs. at 125° C | Hard, tough, clear amber | Nil. |
| 80 | Divinyl benzene | 20 | 0.8 | 24 hrs. at 120° C., 16 hrs. at 150° C. | Hard, yellow | Nil. |
| 90 | ----do---- | 10 | 0.9 | 24 hrs. at 120° C., 16 hrs. at 150° C. | ----do---- | Nil. |

*Benzoyl peroxide.

*Example 1*

In a typical example, portions of vinyl diphenylphosphine oxide were mixed with 2, 3, 4, and 5% amounts of a ditertiary butyl peroxide. These mixtures were heated in a nitrogen atmosphere for 4 hours at 120°–130° C., 4 hours at 150°–155° C. and 16 hours at 165°–175° C. to effect polymerization. The resulting polymers were clear, straw to amber colored, hard brittle resins having excellent flame self-extinguishing characteristics. These polymers are quite soluble in the lower alcohols, acetone and ethyl acetate, and may be precipitated as coatings or films from such solutions by evaporation of the solvent.

Vinyl diphenylphosphine oxide is compatible with and copolymerizes with numerous other monomers and ester compounds containing ethylenically unsaturated bonds, such as methyl methacrylate, styrene, divinyl benzene, diethyl maleate, diallyl beta-cyanoethanephosphonate, polyesters, etc. to produce useful solid resin products having flame-resistance and other useful characteristics.

The copolymers may be produced by mixing vinyl diphenylphosphine oxide and the desired monomer with a The Laminac No. 4116 unsaturated polyester is representative of several grades of commercially available unsaturated polyesters which may be copolymerized with vinyl diphenylphosphine oxide to produce valuable flame-resistant solid resin products. These polyesters are partially polymerized esters as described in U.S. Patents 2,443,736 and 2,443,739 containing an alkenyl aryl cross-linking agent, such as diallyl phthalate, and the reaction product of an alpha, beta, ethylenically unsaturated polycarboxylic acid, such as maleic or fumaric acid, a saturated polycarboxylic acid free of non-benzenoid unsaturation, such as phthalic acid and at least one glycol such as ethylene glycol and/or diethylene glycol.

The copolymers of such unsaturated polyesters with from 25% to 35% vinyl diphenylphosphine oxide are clear, hard tough solid resins having burning times of less than 4 seconds and are considered as highly flame-resistant products.

The above description has been given for clearness and understanding only and no unnecessary limitations are to be implied therefrom.

I claim:
1. A copolymer consisting essentially of vinyl diphenylphosphine oxide and a monomer polymerizable therewith selected from the group consisting of divinyl benzene, diethyl maleate, diallyl beta-cyanoethanephosphonate and a partially polymerized unsaturated polyester containing an alkenyl aryl cross-linking agent and the reaction product of an alpha, beta ethylenically unsaturated polycarboxylic acid, a saturated polycarboxylic acid free of non-benzoid unsaturation and at least one glycol.

2. A copolymer consisting essentially of vinyl diphenylphosphine oxide and a partially polymerized unsaturated polyester containing an alkenyl aryl cross-linking agent and the reaction product of an alpha, beta, ethylenically unsaturated polycarboxylic acid, a saturated polycarboxylic acid free of non-benzoid unsaturation and at least one glycol.

3. A copolymer consisting essentially of vinyl diphenylphosphine oxide and diallyl beta, cyanoethanephosphonate.

References Cited

UNITED STATES PATENTS

| | | | |
|---|---|---|---|
| 2,443,739 | 6/1948 | Kropa | 260—864 |
| 2,957,931 | 10/1960 | Hamilton et al. | 260—606.5 |
| 3,043,821 | 7/1962 | Coover et al. | 260—80 |

FOREIGN PATENTS

| | | |
|---|---|---|
| 590,250 | 4/1959 | Italy. |
| 1,084,027 | 6/1960 | Germany. |

JAMES A. SEIDLECK, *Primary Examiner.*

D. ARNOLD, T. E. LEVOW, DONALD E. CZAJA, *Examiners.*

J. R. LIBERMAN, L. G. CHILDERS, L. WOLF, E. F. McKINNEY, *Assistant Examiners.*